United States Patent
Bertz et al.

(10) Patent No.: US 6,766,684 B2
(45) Date of Patent: Jul. 27, 2004

(54) DOUBLE FLANK ROLLING TESTER

(75) Inventors: Hans-Ulrich Bertz, Kuppenheim (DE); Peter Golder, Ettlingen (DE)

(73) Assignee: Klingelnberg Sohne GmbH, Huckeswagen (DE)

(*) Notice: Subject to any disclaimer, the term of this patent is extended or adjusted under 35 U.S.C. 154(b) by 156 days.

(21) Appl. No.: 10/217,065

(22) Filed: Aug. 12, 2002

(65) Prior Publication Data
US 2003/0037626 A1 Feb. 27, 2003

(30) Foreign Application Priority Data
Aug. 16, 2001 (DE) .......................... 101 40 103

(51) Int. Cl.[7] .......................................... G01M 19/00
(52) U.S. Cl. .................................................. 73/118.1
(58) Field of Search ........................... 73/118.1, 119 R

(56) References Cited

U.S. PATENT DOCUMENTS

| | | | | |
|---|---|---|---|---|
| 3,358,374 | A | | 12/1967 | Jones, Jr. .................. 33/179.5 |
| 4,488,359 | A | * | 12/1984 | Misson ....................... 33/501.8 |
| 4,550,508 | A | * | 11/1985 | Spaeth ..................... 33/501.19 |
| 4,704,799 | A | * | 11/1987 | Kobetsky ................... 33/501.8 |
| 4,831,872 | A | * | 5/1989 | Huang et al. .................. 73/162 |
| 5,016,471 | A | * | 5/1991 | Och ............................ 73/162 |
| 5,689,993 | A | | 11/1997 | Matsumoto .................. 73/162 |

FOREIGN PATENT DOCUMENTS

| | | | | |
|---|---|---|---|---|
| DE | 34 15 631 C2 | 1/1986 | ............ | G01B/5/20 |
| DE | 39 03 333 C2 | 9/1989 | .......... | G01M/13/02 |
| DE | 29 33 891 C2 | 10/1989 | .......... | G01B/21/16 |
| DE | 38 23 978 A1 | 1/1990 | ............ | G12B/3/00 |
| DE | 42 31 275 A1 | 3/1994 | .......... | G01B/21/20 |
| DE | 196 41 720 A1 | 4/1998 | .......... | G01B/5/012 |
| DE | 200 05 299 U1 | 9/2000 | .......... | G01M/13/00 |
| DE | 201 13 548 U1 | 12/2001 | .......... | G01M/13/02 |
| EP | 0 693 669 A2 | 7/1995 | .......... | G01B/7/012 |
| JP | 11-132911 | 5/1999 | .......... | G01M/13/02 |

* cited by examiner

Primary Examiner—Edward Lefkowitz
Assistant Examiner—Jermaine Jenkins
(74) Attorney, Agent, or Firm—McCormick, Paulding & Huber LLP

(57) ABSTRACT

A tester for backlash-free rolling of gears with a mating gear generally comprises a base, a stationary spindle on which a test gear can be mounted and which can be driven by a motor; an oscillating slide on which a rotary mounting device is located with an axis of rotation for loosely rotating the mating gear and which slide being guided for easy movement in the direction of the center distance of the two gears; first means for setting a specified test center distance between the two gears; second means providing a specifiable test force for a constant tight mesh of the two gears; and third means for measuring center distance variations during the rotation of two gears. To simplify and reduce design costs of such testers, the stationary part of a linear motor is disposed on the base and the moveable part thereof is disposed to the oscillating slide, and an associated separate CNC control is provided to allow the linear motor to be used for said three means.

4 Claims, 3 Drawing Sheets

DOUBLE FLANK ROLLING TESTER

CROSS-REFERENCE TO RELATED APPLICATIONS

This application is entitled to the benefit of and incorporates by reference essential subject matter disclosed in German Patent Application No. 101 40 103.5 filed on Aug. 16, 2001 in the name of Klingelnberg Söhne GmbH.

BACKGROUND OF THE INVENTION

The invention refers to an apparatus for testing gears by rolling without backlash with a mating gear according to the preamble of claim 1. An apparatus of this kind is known from DE 34 15 631 C2.

Such apparatus are frequently used in automated gear production lines, for instance to test previously hobbed gear teeth before the next working step is performed on the same workpiece. This can prevent that a severely malformed gear is unnecessarily further processed or impedes the next working step, causes increased tool wear or even destroys the tool. Such a gear is discovered on time and removed from production as a result of the test.

For this purpose, each gear is automatically fed to a tester and is clamped on a motor-driven spindle having a stationary axis of rotation. A mating gear, or master gear, which loosely rotates on an oscillating slide, is advanced towards the test gear from a secure parking position and is automatically brought into mesh with the test gear. After the teeth of both gears got double flank contact, the oscillating slide is displaced somewhat against a spring force, so that an adequate test force exists at the so-called test center distance "a". Then the spindle makes at least one full revolution with the test gear wherein the mating gear follows in tight mesh. Gearing deviations cause the oscillating slide to reciprocate in the direction of the center distance. These center distance variations are measured and, if a given upper or lower tolerance limit is passed, the tested gear is sorted out.

Obviously, such automatic testing apparatus are continuously further developed. The major selective criteria for this are high operational reliability, adaptability to different tooth systems, and test results containing as much information as possible. For example, numerous testers are already known that can be used for the described double flank rolling test. Here are only a few:

The double flank rolling tester according to DE 34 15 631 C2 has automatically operated engaging means characterized in that the loosely following mating gear is held in a specific rotary position by a magnet which is oriented toward a tooth of the mating gear, and that the work gear is assigned to a positioning device likewise working with a magnet or a sensor. This is to guarantee that for engaging, a tooth of the mating gear precisely matches with a tooth gap of the test gear. Aside from this, the tester as shown in FIG. 6 of this published patent has the classic design, namely the movable first slide 14 is biased by a mechanical spring F and located on a second slide 16 which in turn is slidably mounted on a flat guide 18 of the base 2 in order to set the test center distance. The publication does not reveal whether a pneumatic cylinder or a stepping motor with threaded spindle is provided for this setting. The center distance deviations ±Δa are measured according to FIG. 6 with a conventional electric probe.

The more recent utility model DE 200 05 299 U1 refers to an apparatus for quality testing of gears. In addition to a measuring unit that operates according to the single flank or double flank rolling principle and that has a master gear and a clamping device, this apparatus also has conveyor means for feeding the test pieces to the clamping device and for removing them after the rolling test. Its primary features are that the master gear and the test gears mounted on the clamping device rotate about vertical axes, and that the conveyor means has a gripper for grasping the test gears. Thus, the measuring unit hardly differs from the tester of DE 34 15 631 C2 described above, with two exceptions: According to FIG. 6 of this publication, the oscillating slide 34 is not disposed on the slide 30, but rather both slides are arranged one after the other on the base plate 28; they are guided so as to be moved longitudinally in the same direction; and they are interconnected solely through spring means. This is intended to allow greater precision of the discoupled oscillating slide. Also, in this way the accelerations of the oscillating slide 34 during rolling of the gears are said to be more exactly measured by the sensor 38 than is generally the case if the center distance variations are measured with a linear encoder.

A further, known "testing machine, especially for gears" (DE 29 33 891 C2) deals with the accuracy and evaluation of measured signals from the center distance variations recorded by a sensor. This involves circuits for a now obsolete carrier frequency measuring amplifier. This publication is only significant for the prior art insofar as FIG. 4 contains the schematic representation of a cardan-suspended probe to be used for measuring helix deviations and taper of the gear teeth. However, this probe is very complex in design and is not suitable for use in automated production lines.

The invention "Automatic Gear Checking Structure and Method" according to U.S. Pat. No. 4,488,359 is an improvement over the foregoing patent specification, since variations in the angle of rotation of the master gear relative to the test gear are to be measured in addition to the center distance variations, to enhance the validity of the measurement. To be sure, the circuits described here are somewhat more modern, but the mechanical design of the apparatus, which again is only schematically shown, has hardly been developed further. According to its FIG. 3, the master gear 40 is held in a fork 66 so as to rotate about its horizontal axis 98. The fork 66 merges into a cylindrical shaft 68 which in turn is easily pivotable about the axis 96 and adapted to be easily displaceable in the same bearing in the longitudinal direction 90. Inductive positional transducers 20 and 22 are to record the movements that may occur in the testing process. In this invention, however, no second slide or corresponding means is provided by which another test center distance could be set, for instance to test gears with larger diameters. Instead, there is a slide 44 which supports a rotatable spindle 51 and which can be reciprocated coaxially to the second spindle 58 by a working cylinder 48. The test gears 38, which have a center bore, are automatically centered and clamped by this means. For this purpose an inclined ramp 36 is provided, on which the test gears are fed by gravity to the testing apparatus. After testing the slide 44 moves back, the test gears are released and fall for further transport onto a second inclined ramp 42.

A double flank rolling tester is known from DE 42 31 275 A1, in which a mounting device supporting a master gear or a test gear can be driven linearly relative to a device base by a motor and an acme threaded spindle.

Double flank rolling testers differ significantly from single flank rolling testers in which gears are tested at a fixed center distance. In the latter case only one flank of any tooth comes into contact when the two gears are rotated, and the instantaneous angle deviation of the driven gear is measured relative to the theoretically correct angular position resulting from the transmission ratio. For example, a device of this type is described in the U.S. Pat. No. 3,358,374.

In other types of measuring devices that are neither double flank nor single flank rolling testers there are developments utilizing linear motors, for instance to position a probe in X, Y, and Z directions. They replace the conventional combination of electric motor and ball screw, such as those frequently used in 3D measuring devices. A particularly precise, but very complex solution is described in DE 38 23 978 A1. In this linear guide means for precision machines the movable part is supported relative to the stationary part by magnetic or air bearings and the electrically driven linear motor is engineered to be superconducting, so that the heat losses in the magnet coils do not affect the accuracy of the measuring device. This can be necessary for absolute longitudinal measurements in coordinate measuring devices, but it is not worthwhile for relative measurements like center distance variations in the double flank rolling test.

Scanning heads for coordinate measuring devices (such as in EP 0 693 669 A2) include power generators mounted on the leaf spring guides of the scanning element for the three displacement directions X, Y, Z. These power generators each generate a measuring force together with the leaf springs. They are also used for damping or even clamping in one of the displacement directions. These power generators comprise a coil and a magnet as the core, and they thus use the same physical effect as a linear motor; however, the maximum traveling distances are less than 1 mm.

The scanner head with an electronic guide according to DE 196 41 720 A1 is very similarly designed. It is characterized in that its driving device binds the probe by means of the power generators to an area with a curved contour, preferably on a spherical surface. This should enable the scanner head to determine not only the space coordinates but also the normal of an unknown workpiece surface at the measured point in question. In this invention, the magnet cores likewise move only over very short distances in their coils, which are also referred to in the publication as electromagnetic direct drives. For this reason, this type of drive can not be used in double flank rolling testers.

BRIEF SUMMARY OF THE INVENTION

In the light of this state of the art, the object of the invention is to further simplify the design of a double flank rolling tester, especially for the automatic test run in production lines, without restricting proven functions of the known testing devices.

This object is achieved in accordance with the invention by an apparatus for testing gears by rolling without backlash with a mating gear, generally a master gear, comprising a base, having a stationary spindle on which a test gear can be mounted and which can be driven numerically controlled by a motor with a coaxial rotary encoder an oscillating slide on which a rotary mounting device is located with either a fixed or a self-aligning axis of rotation for loosely rotating the mating gear, said slide being guided for easy movement in the direction of the center distance of the two gears,

| | |
|---|---|
| first means | for setting a specified test center distance between the two gears, |
| second means | providing a specifiable testing force for the constant tight mesh of the two gears, |
| third means | for measuring center distance variations during the rotation of the two gears, | characterized in that the stationary part of a linear motor is disposed on the base and the movable part thereof is disposed to the oscillating slide, and that an associated computer numerically controlled (CNC) is provided to allow the linear motor to be used for said three means.

The base of the novel testing apparatus preferably supports the longish stationary part of a linear motor and the shorter movable part is disposed to the oscillating slide. The control of the linear motor is designed not only to permit a specified test center distance to be set, but also so that a specifiable test force is generated by the linear motor and center distance variations are recorded.

The simplification and cost reduction that are thereby achieved in the design and assembly of the double flank rolling tester are obvious. The conventional second slide that adjusts the oscillating slide to the test center distance is omitted altogether. The linear motor is not only used to position the oscillating slide, but it also replaces the conventional, usually mechanical springs. With the aid of the CNC control it is possible to set the amount of test force that is optimal for the test gears and to keep it constant even over the whole range of the center distance variations. Furthermore, the linear measuring system provided at each linear motor is additionally used to measure the center distance variation which occurs when rolling without backlash, and to have the measured values stored and evaluated by the CNC control. Finally, manual settings in conventional automatic double flank rolling testers, such as limit switches, stops or the like, are eliminated in that they are programmed once in the CNC control of the linear motor for a specific test gear/master gear combination, then they are stored and made available on call with the same accuracy.

In a preferred embodiment of the invention, the longish stator comprising a series of coils is provided as the stationary part of the linear motor and the short runner of the linear motor, made up of only a few permanent magnets, is provided as the movable part. The advantage in a double flank rolling tester lies in the space-saving arrangement of this linear motor type. A further advantage is that the easily movable oscillating slide requires no energy supply through a cable and that the heat occurring in the coils can be more easily removed through the base than from the slide.

In a further embodiment of the invention the mating gear is mounted in pendulum fashion on the oscillating slide by means of a central ball and a corresponding calotte, and the angular displacements of its axis of rotation during backlash-free rolling with the test gear can be measured with two displacement sensors arranged perpendicularly to one another and to the nominal position of the axis of rotation. In this simple manner helix deviations and taper on the test gear can also be determined with the testing apparatus according to the invention. To simultaneously measure these deviations together with the double flank rolling deviations $F_i''$, and $f_i''$, two oscillating slides opposite to one another are preferably provided at the stationary spindle of the testing apparatus. One of the oscillating slides carries the mating gear with the fixed axis of rotation, and the other carries a second mating gear with the self-aligning axis of rotation. This combination can be implemented in advantageous manner especially with oscillating slides equipped with linear motors according to the invention.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
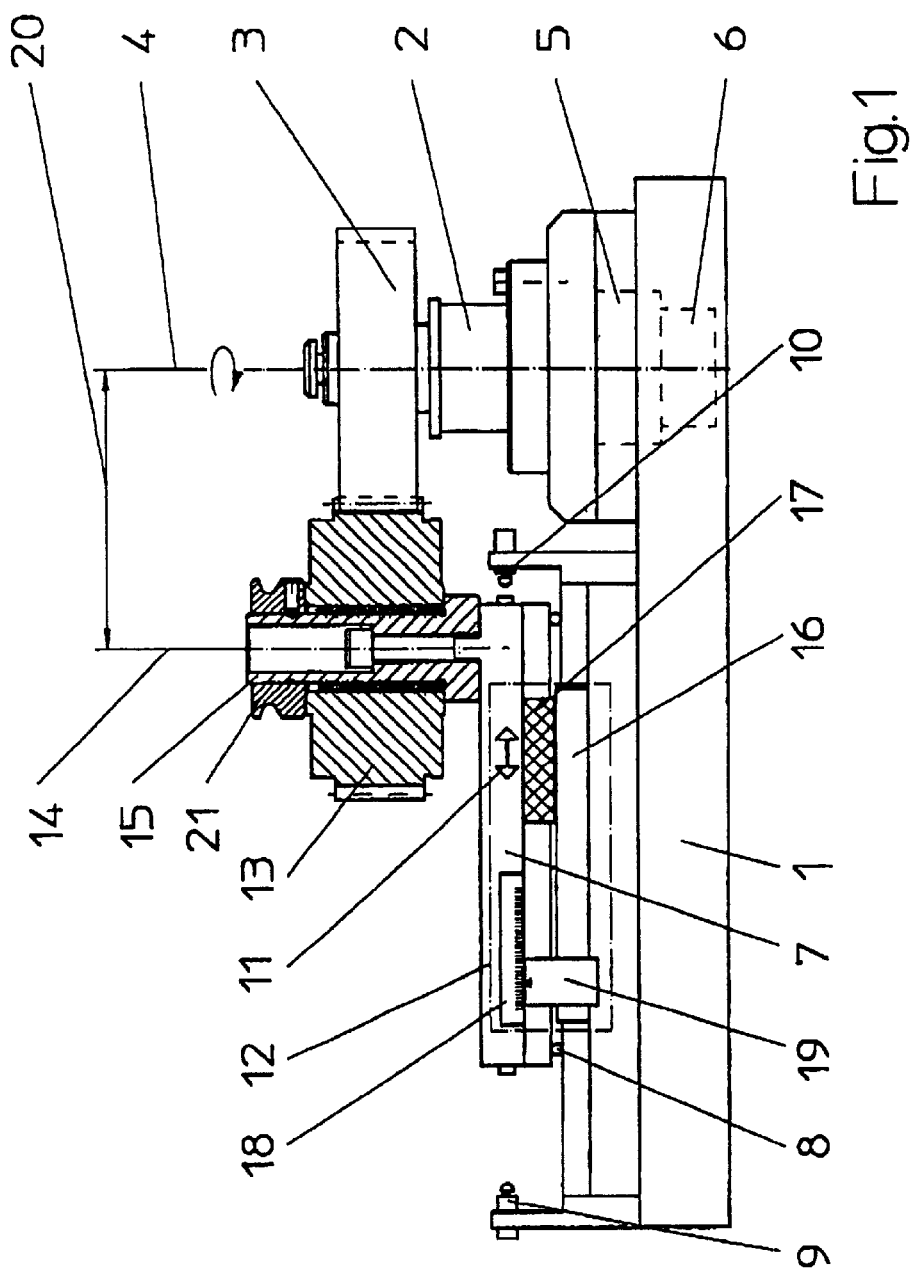
FIG. 1 shows a schematic side view of a testing apparatus according to the invention.

In FIG. 1 a base 1 supports a stationary spindle 2 on which a test gear 3 is clamped so as to rotate about an axis 4. A motor 5 drives the spindle. The angular positions of the spindle are measured by a rotary encoder 6. Additionally on base 1, there is an oscillating slide 7 which is guided by an antifriction slideway 8 between stops 9 and 10 and is easily movable in the direction of the bidirectional arrow 11. The oscillating slide 7 can be driven by a linear motor 12 comprising a longish stator 16 on the base 1 and a short runner 17 beneath the oscillating slide 7. To the linear motor 12 there belongs also a computer numerically controlled (CNC) that is not shown in a linear encoder. It comprises a glass scale 18 and a scanning head 19. Furthermore, a cylindrical pivot 15 for mounting a mating gear is attached to the oscillating slide 7. In this case a master gear 13 can rotate loosely about the fixed axis 14 of the pivot 15.

At the beginning of a double flank rolling test the oscillating slide 7 with the master gear 13 is located in the rearmost position at stop 9. The test gear 3 can be mounted on the spindle 2 with no space problems or risk of damage. It is centrically clamped to the axis 4 by a clamping means not shown in detail. The CNC control is programmed with the test procedure and the actual dimensions of the test gear 3 and the master gear 13. The automatic run can start.

To get the teeth into mesh the linear motor 12 moves the oscillating slide with the master gear 13 towards the test gear 3 leaving a small safety clearance and then moves on at creep speed. If during this the linear encoder determines that the distance 20 between the axes 4 and 14 does not become less than half of the sum of both outer gear diameters including a permissible tolerance, the linear motor 12 withdraws the master gear 13. This is because the control assumes that the tooth tip of the one gear has not found its way into the gap of the other gear. Now, the motor 5 rotates the test gear 3 by half of one pitch with the aid of the rotary encoder 6. Since the tip thickness is always substantially smaller than the gap width at the tip of the mating gear, the second attempt to engage will succeed without the tooth tips contacting each other. If not, the CNC control assumes that the test gear does not have proper teeth and sorts it out. On the other hand, if during creep speed of the oscillating slide 7 the test center distance is already substantially undershot, the test gear 3 is too small and is likewise rejected.

After the gears have been successfully engaged the center distance 20 lies within an expected range and the CNC control switches the linear motor 12 from the travel mode to an operating mode for the real rolling test. Ordinarily, the CNC control of a linear motor ensures that a specified position is reached at a certain speed, and if there are any obstacles the current intensity is increased to still reach the destination. So, after the travel mode, the linear motor has to provide a specified test force for the double flank rolling test. For this purpose, the CNC control allows only a certain current to flow into the coils of the stator 16, independently of the actual position of the oscillating slide 7. Thus, according to the invention, not only the relatively expensive mechanical spring systems are replaced, but also the test force remains constant independently of the rolling deviations, something which does not succeed with mechanical springs.

During the subsequent double flank rolling test, the motor 5 rotates the test gear 3 by slightly more than a full revolution in a manner that is known per se. The master gear 13 follows the test gear in constant tight mesh caused by the test force. At the same time, the scanning head 19 picks up any occurring displacements of the oscillating slide 7 at the glass scale 18 of the linear motor 12—no additional displacement sensor is required for this—and transfers the signals to the CNC control for evaluation. Afterwards the operating mode is switched over again, and the linear motor 12 moves the oscillating slide 7 back to the starting position. The clamping device is opened and, depending on the evaluation of the measurement, the tested gear 3 is placed with the good parts, with those to be remachined or with the rejects.

Figure 2:
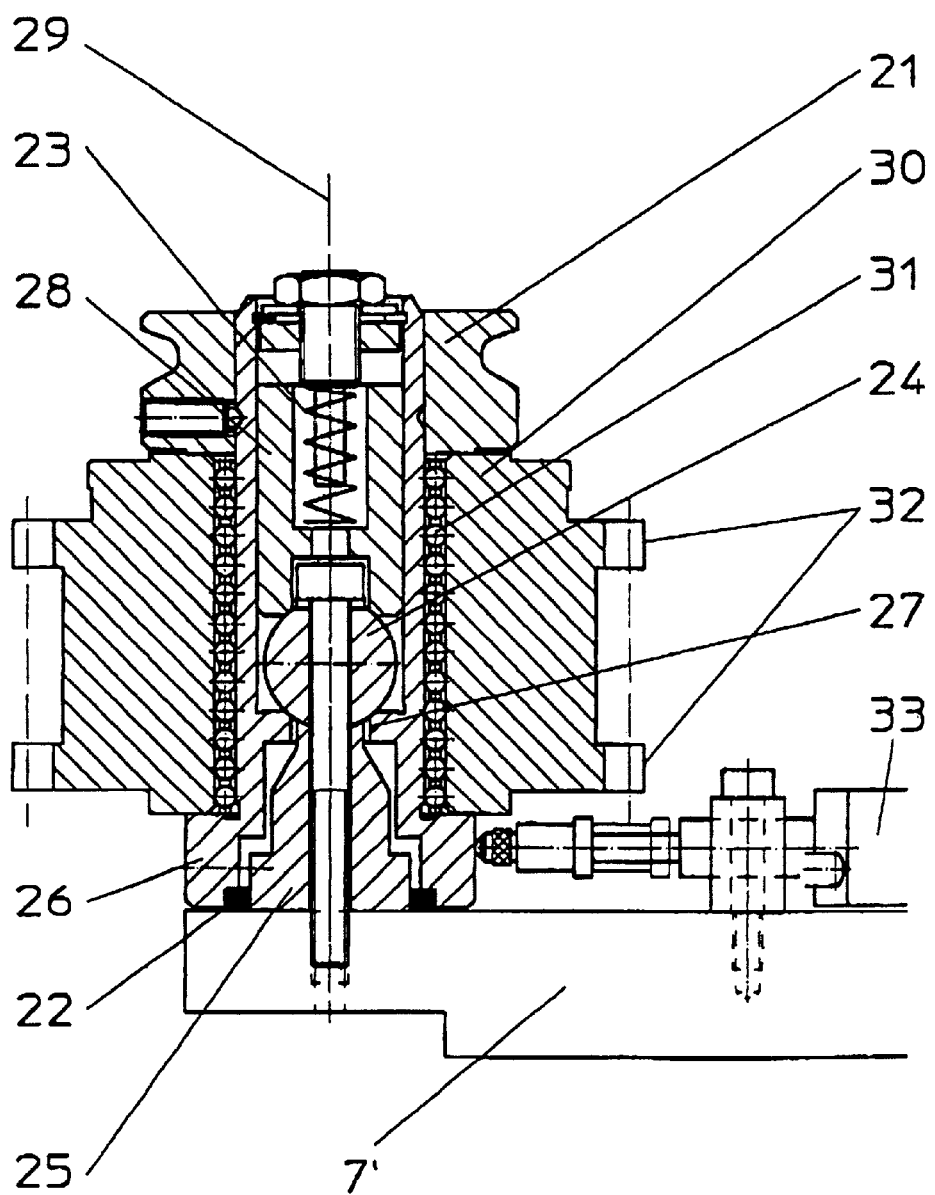
FIG. 2 shows a section through the self-aligning axis of rotation for the mating gear.

In contrast to the known double flank rolling testers, the novel tester has a simpler design not only with regard to the oscillating slide, but also regarding a self-aligning mounting device for the mating gear. FIG. 2 shows a section through an embodiment of this bearing assembly according to the invention.

An oscillating slide 7' carries a fixed conical pivot 25 with a ball 24 located on the smaller diameter of the pivot. A cylindrical sleeve 26 with an inner collar 27 and a counterpart 28 axially guided in said sleeve, surround the ball 24, and form a calotte. Since the sleeve 26 and the counterpart 28 are biased against one another by an adjustable spring 23, there is no play between the ball 24 and the calotte, the latter—strictly speaking—comprises only two inner conical surfaces, one at the collar 27 and one at the end face of the counterpart 28. With this construction, the axis 29 of the cylindrical sleeve 26 can move by small angles relative to the fixed pivot 25. A simple elastic ring 22 is located at the lower end between the sleeve and the pivot, and without any force acting upon the sleeve its axis 29 assumes the same position as the fixed axis 14 of the cylindrical pivot 15 in FIG. 1.

Furthermore, according to FIG. 2, the mating gear 30 is loosely mounted so as to rotate on the outer diameter of the sleeve 26 via a ball cage 31, and it is axially held by a ring fastener 21. Contrary to the master gear 13 for the double flank rolling test, the mating gear 30 is not embodied with its full tooth width for testing helix deviations and tooth taper. Due to a recess only the tooth ends 32, which mesh with the test gear 3, are formed. Since the ball 24 is disposed approximately halfway between the two tooth ends 32, the mating gear 30 with its axis 29 will under test force easily adapt for instance to a conical contour of the test gear 3. The corresponding angular change of the sleeve 26 can be measured with a first displacement sensor 33 mounted on the oscillating slide 7' and touching the lower edge of the sleeve 26 in the direction of the center distance. In the case of helix deviations the axis 29 will tilt by a small angle in a plane that is perpendicular to the section shown in FIG. 2. Accordingly, a second linear encoder 33 is mounted on the oscillating slide 7'. It touches the lower edge of the sleeve 26 perpendicularly to the direction of the first linear encoder and is therefore hidden from view.

Figure 3:
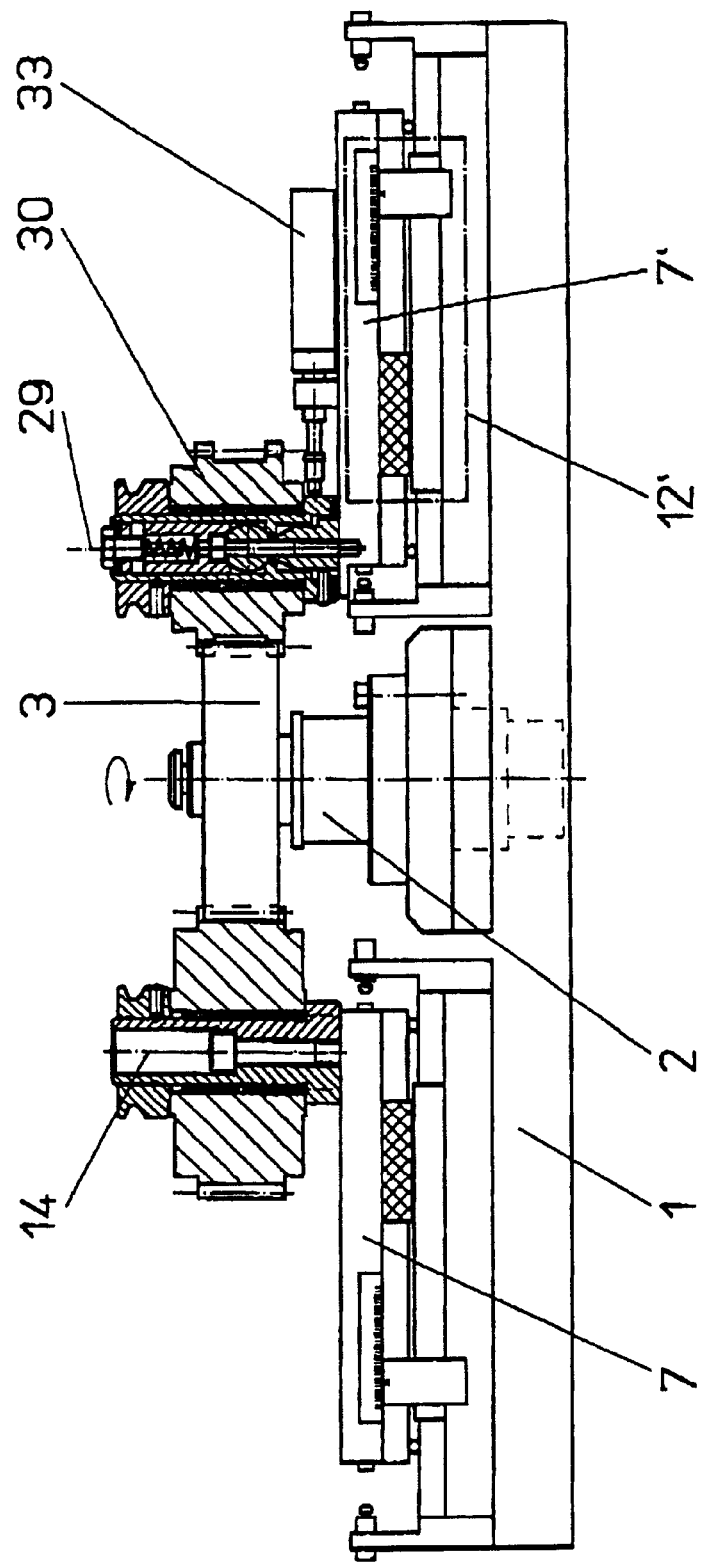
FIG. 3 shows a schematic side view of a combined tester.

The combined tester in FIG. 3 shows on the left the double flank rolling tester according to the invention as shown in FIG. 1, with a fixed axis of rotation 14 and a stationary spindle 2 on which the test gear 3 is clamped. On the right a second oscillating slide 7' is represented on the extended base 1. The self-aligning axis of rotation 29 according to FIG. 2, with the mating gear 30, is located on the second slide. This mating gear meshes also with the test gear 3. According to the invention, the second oscillating slide 7' is likewise equipped with a linear motor 12' which performs the same functions as with the first oscillating slide 7, with the exception that no displacements of the oscillating slide 7' are measured. Instead, angular deviations of the axis 29 from its nominal position are measured by the two linear displacement sensors 33. The CNC control evaluates these measured values separately in a known manner according to helix deviations and taper of the test gear 3.

In FIG. 3 the two oscillating slides 7 and 7' are mutually offset by 180° with reference to the spindle 2. However, for space reasons they can also be offset by 120° or another angle. It also happens that two or more different gears on one shaft have to be automatically tested. In such cases the advantages of the tester with linear motor according to the invention are even greater.

LIST OF REFERENCES 1 base
2 stationary spindle
3 test gear
4 axis of test gear
5 motor
6 rotary encoder
7, 7' oscillating slide
8 antifriction slideway
9, 10 stop
11 bidirectional arrow
12 linear motor
13 master gear or mating gear
14 axis of master or mating gear
15 pivot
16 stator
17 runner
18 glass scale
19 scanning head
20 test center distance
21 ring fastener
22 elastic ring
23 spring
24 bail
25 conical pivot
26 sleeve
27 collar
28 counterpart
29 self-aligning axis
30 mating gear
31 bail cage
32 tooth end
33 displacement sensor It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for testing gears by rolling without backlash with a mating gear, generally a master gear, comprising a base, comprising:

a stationary spindle on which a test gear can be mounted and which can be driven numerically controlled by a motor with a coaxial rotary encoder, an oscillating slide on which a rotary mounting device is located with either a fixed or a self-aligning axis of rotation for loosely rotating the mating gear, said slide being guided for easy movement in the direction of the center distance of the two gears,

| | |
|---|---|
| first means | for setting a specified test center distance between the two gears, |
| second means | providing a specifiable testing force for the constant tight mesh of the two gears, |
| third means | for measuring center distance variations during the rotation of the two gears, and wherein | a stationary part of a linear motor is disposed on the base and a movable part thereof is disposed to the oscillating slide, and that an associated computer numerically controlled (CNC) is provided to allow the linear motor to be used for said three means.

2. The apparatus according to claim 1, wherein an elongated stator comprising a series of coils is provided as the stationary part of the linear motor, and a short runner comprising only a few permanent magnets is provided as the movable part of the linear motor.

3. The apparatus according to claim 1, wherein a ball and a calotte are provided on the oscillating slide forming the self-aligning axis of rotation for the mating gear, said ball and said calotte being arranged in the middle of the mating gear, and with elastic means holding the self-aligning axis in a nominal position relative to the spindle of the test gear.

4. The apparatus according to claim 3, wherein during the backlash-free rolling of the test gear with the mating gear angular displacements of the self-aligning axis of rotation can be measured by two displacement sensors arranged perpendicularly to one another and to its nominal position on the oscillating slide.

* * * * *